(No Model.)
G. E. THOMAS.
HOSE CLAMP.
No. 597,443.　　　　　　　　Patented Jan. 18, 1898.
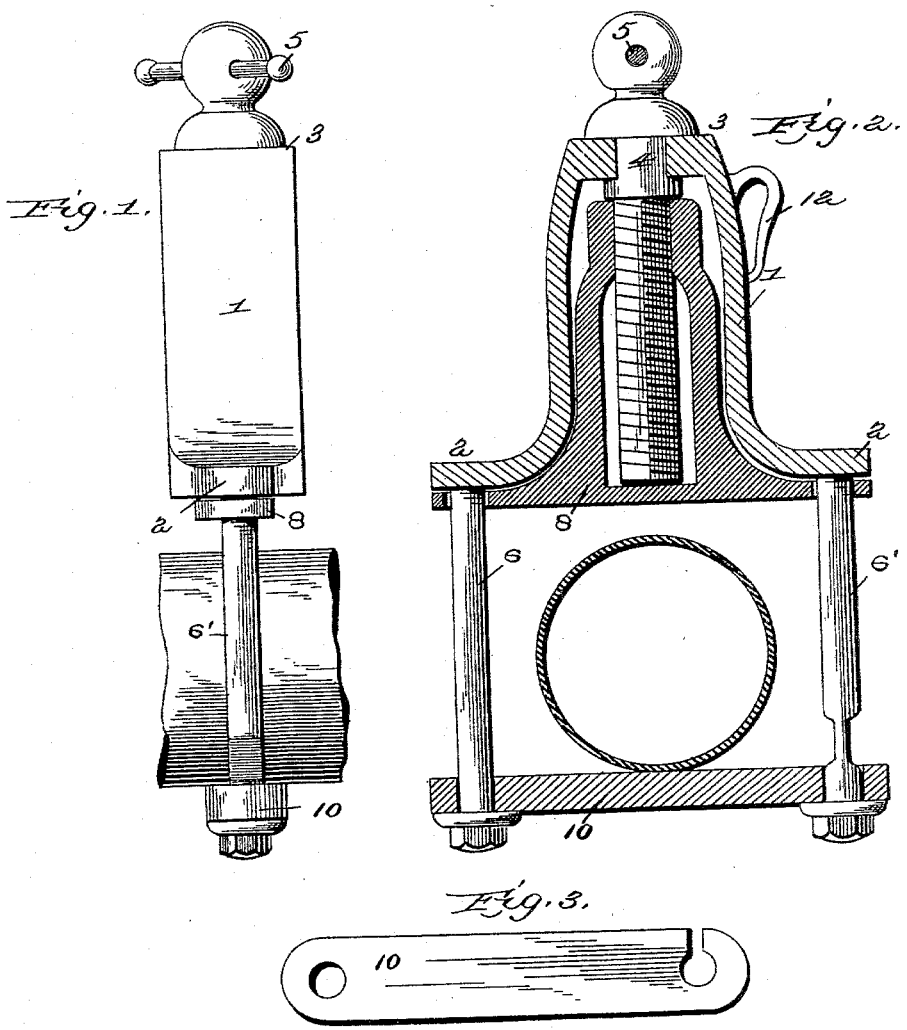
Attest
F. L. Middleton
E. W. Middleton
Inventor
Geo. E. Thomas
by Eric Spear
Atty.

UNITED STATES PATENT OFFICE.

GEORGE E. THOMAS, OF QUINCY, MASSACHUSETTS.

HOSE-CLAMP.

SPECIFICATION forming part of Letters Patent No. 597,443, dated January 18, 1898.

Application filed March 9, 1897. Serial No. 626,617. (No model.)

*To all whom it may concern:*

Be it known that I, GEORGE E. THOMAS, a citizen of the United States, residing at Quincy, in the county of Norfolk and State of Massachusetts, have invented certain new and useful Improvements in Hose-Clamps, of which the following is a specification, reference being had therein to the accompanying drawings.

This invention relates to hose-clamps which are designed to be used to squeeze or compress the walls of a hose together to stop the flow of water therethrough when it is desired to insert a new section of hose for any purpose, such as to replace a burst section or to lengthen the line, without the necessity of cutting off the supply at the main.

The invention includes a body in the form of a guiding-casing providing a bearing for a screw which carries a compressor-plate adapted to operate in combination with a pivoted base-plate held to the casing by vertical posts which guide the compressor-plate.

The invention is illustrated in the accompanying drawings, in which—

Figure 1 is a side elevation of the device. Fig. 2 is a vertical section of the same. Fig. 3 is a detail view.

The clamp is adapted to be made of brass or any other suitable metal. The hollow body 1 is substantially rectangular in cross-section, with the upper portion of the sides rounded and their lower portions flared outwardly, said sides having outwardly-extending ears 2 at their bottoms. The top 3 of the casing is flat and is provided with an opening which receives the plain narrowed shank of a screw 4. The shank is shouldered above and below said narrowed portion to form a bearing on the upper and lower face of the flat top to hold the screw against vertical movement in said body. The shank is surmounted by a bulbous head having an opening therethrough which receives the handle 5. Fixed to the base-ears 2 and depending therefrom are the oppositely-arranged posts 6 6', upon which the compressor-plate 8 is guided. This plate has oppositely-arranged arms extending upward and shaped to fit within the opening in the body, the upper ends thereof being joined together by a web having a threaded socket which is screwed onto the threaded portion of the screw 4. A base-plate 10 is pivoted at one of its ends on the post 6, and is held in place thereon by a suitable nut and washer, the opposite end of said plate having an opening to receive the post 6' and a slot leading from said opening to its edge to permit the said post 6' to enter said opening, said post 6' having a narrowed portion which is passed through said slot. A washer and nut are fixed on the end of this post, and the base-plate normally rests upon the face of this washer. A bail or handle 12 projects laterally from the upper part of the body, by which it may be strung on the fireman's belt when not in use.

In placing the clamp around a hose the end of the base-plate is raised slightly until the slot therein alines with the narrowed portion of the post 6', when it may be swung around on the post 6. The hose is then forced in between said plate and the compressor-plate, which is in its raised position. The base-plate is then swung back into place beneath the hose and again secured on the post 6'. By operating the screw the hose is squeezed between the compressor-plate and the base-plate and the flow of water therethrough checked. This clamp will accommodate and operate effectually on hose of any diameter or thickness of wall.

I am aware that it is not novel to utilize a screw to compress a tube, and I therefore disclaim the generic features of such a structure.

I claim—

1. In combination the body, the screw carried thereby, the posts extending from said body, the compressor-plate carried by said screw and guided on said posts, and the base-plate pivotally connected to one of said posts and detachably connected to the opposite post, substantially as described.

2. In combination, the body, the screw, the compressor-plate, the posts extending from said body, the base-plate pivoted at one end on one of said posts and having an opening in the opposite end with a slot leading thereto, the opposite post having a narrowed portion adapted to pass through said slot and a washer on said post adapted to support the slotted end of said base-plate, substantially as described.

In testimony whereof I affix my signature in presence of two witnesses.

GEORGE E. THOMAS.

Witnesses:
RODNEY LUND,
C. H. WELCH.